United States Patent
Kim et al.

(10) Patent No.: US 10,857,996 B2
(45) Date of Patent: Dec. 8, 2020

(54) APPARATUS AND METHOD FOR CONTROLLING SAFETY OF AUTONOMOUS PARKING SYSTEM

(71) Applicants: HYUNDAI MOTOR COMPANY, Seoul (KR); KIA MOTORS CORPORATION, Seoul (KR)

(72) Inventors: Yun Sik Kim, Seoul (KR); Jin Ho Park, Hwaseong-si (KR); Dae Joong Yoon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 218 days.

(21) Appl. No.: 15/993,850

(22) Filed: May 31, 2018

(65) Prior Publication Data

US 2019/0217855 A1 Jul. 18, 2019

(30) Foreign Application Priority Data

Jan. 12, 2018 (KR) .......................... 10-2018-0004501

(51) Int. Cl.
*B60W 30/06* (2006.01)
*G06K 9/00* (2006.01)
(Continued)

(52) U.S. Cl.
CPC ............ *B60W 30/06* (2013.01); *B60W 10/18* (2013.01); *B60W 10/20* (2013.01); *B60W 10/30* (2013.01);
(Continued)

(58) Field of Classification Search
CPC ...... B60W 10/18; B60W 10/20; B60W 10/30; B60W 2050/0074; B60W 2420/54;
(Continued)

(56) References Cited

U.S. PATENT DOCUMENTS 9,739,226 B2 * 8/2017 Elwart ................... B60K 28/04
2017/0021828 A1 1/2017 Seo et al.
(Continued)

FOREIGN PATENT DOCUMENTS

JP 2015-0191264 A 11/2015
JP 2015-0200933 A 11/2015
(Continued)

*Primary Examiner* — Tyler J Lee
(74) *Attorney, Agent, or Firm* — Brinks Gilson & Lione

(57) ABSTRACT

A safety control apparatus for an autonomous parking system includes: a sensor collecting data of a vehicle; a communication device transmitting a message informing a presence of a passenger in the vehicle to a driver terminal depending on whether the passenger is present in the vehicle; a driver device performing an autonomous parking operation when the autonomous parking operation for the vehicle is selected through the driver terminal; and a controller determining whether the passenger is present in the vehicle before the autonomous parking operation. The controller also determines whether the passenger in the vehicle intends to exit the vehicle, and controls an operation of the driver device during the autonomous parking operation.

15 Claims, 6 Drawing Sheets

(51) Int. Cl.
  *B60W 50/14*    (2020.01)
  *B60W 10/20*    (2006.01)
  *B60W 10/30*    (2006.01)
  *B60W 10/18*    (2012.01)
  *B60W 50/00*    (2006.01)

(52) U.S. Cl.
  CPC ......... *B60W 50/14* (2013.01); *G06K 9/00812*
      (2013.01); *G06K 9/00832* (2013.01); *G06K*
           *9/00838* (2013.01); *B60W 2050/0074*
             (2013.01); *B60W 2420/54* (2013.01)

(58) Field of Classification Search
  CPC .. B60W 30/06; B60W 50/14; G06K 9/00812;
              G06K 9/00832; G06K 9/00838
  See application file for complete search history.

(56) References Cited

U.S. PATENT DOCUMENTS

| | | | |
|---|---|---|---|
| 2017/0123423 A1 | 4/2017 | Sako et al. | |
| 2018/0075744 A1 | 3/2018 | Seo et al. | |
| 2018/0321685 A1* | 11/2018 | Yalla | G05D 1/0276 |
| 2019/0016312 A1* | 1/2019 | Carlson | F17C 13/02 |
| 2019/0016331 A1* | 1/2019 | Carlson | B60W 30/06 |
| 2019/0016384 A1* | 1/2019 | Carlson | G05D 1/0274 |

FOREIGN PATENT DOCUMENTS

| | | |
|---|---|---|
| JP | 2017-0059254 A | 3/2017 |
| JP | 2017-0136977 A | 8/2017 |
| KR | 10-2017-0011150 A | 2/2017 |
| KR | 10-2018-0028804 A | 3/2018 |

\* cited by examiner

| STAGE | BEFORE VEHICLE STARTS DRIVING | VEHICLE IS RUNNING | PASSENGER GETS OUT OF VEHICLE AFTER VEHICLE STOPS | VEHICLE IS IN AUTONOMOUS PARKING MANUEVER | PERFORM SAFETY MEASURE |
|---|---|---|---|---|---|
| IMAGE | | | | | P |
| FUNCTION | COLLECT NUMBER OF PASSENGER WHO GET IN VEHICLE AND NUMBER OF PASSENGER WHO GET OUT OF VEHICLE USING SVM SYSTEM | CONSTANTLY SENSE PASSENGER | COLLECT NUMBER OF PASSENGER WHO GET IN VEHICLE AND NUMBER OF PASSENGER WHO GET OUT OF VEHICLE USING SVM SYSTEM | CONSTANTLY SENSE PASSENGER | PUT GEAR SHIFT ON PARKING MODE AND TRANSMIT MESSAGE TO DRIVER'S TERMINAL |
| CONFIGURATION | SVM SYSTEM | VOICE RECOGNITION SENSOR | SVM SYSTEM | VOICE RECOGNITION SENSOR | DRIVER DEVICE AND COMMUNICATION DEVICE |

FIG. 3

| STAGE | BEFORE VEHICLE STARTS DRIVING | VEHICLE IS RUNNING | PASSENGER GETS OUT OF VEHICLE AFTER VEHICLE STOPS | VEHICLE IS IN AUTONOMOUS PARKING MANUEVER | PERFORM SAFETY MEASURE |
|---|---|---|---|---|---|
| IMAGE | | | | | P |
| FUNCTION | COLLECT NUMBER OF PASSENGER WHO GET IN VEHICLE AND NUMBER OF PASSENGER WHO GET OUT OF VEHICLE USING SVM SYSTEM | CONSTANTLY SENSE PASSENGER | COLLECT NUMBER OF PASSENGER WHO GET IN VEHICLE AND NUMBER OF PASSENGER WHO GET OUT OF VEHICLE USING SVM SYSTEM | CONSTANTLY SENSE PASSENGER | PUT GEAR SHIFT ON PARKING MODE AND TRANSMIT MESSAGE TO DRIVER'S TERMINAL |
| CONFIGURATION | SVM SYSTEM | ULTRASONIC SENSOR | SVM SYSTEM | ULTRASONIC SENSOR | DRIVER DEVICE AND COMMUNICATION DEVICE |

FIG. 4

| STAGE | BEFORE VEHICLE STARTS DRIVING | VEHICLE IS RUNNING | PASSENGER GETS OUT OF VEHICLE AFTER VEHICLE STOPS | VEHICLE IS IN AUTONOMOUS PARKING MANUEVER | PERFORM SAFETY MEASURE |
|---|---|---|---|---|---|
| IMAGE | | | | | P |
| FUNCTION | COLLECT NUMBER OF PASSENGER WHO GET IN VEHICLE AND NUMBER OF PASSENGER WHO GET OUT OF VEHICLE USING SVM SYSTEM | CONSTANTLY SENSE PASSENGER | COLLECT NUMBER OF PASSENGER WHO GET IN VEHICLE AND NUMBER OF PASSENGER WHO GET OUT OF VEHICLE USING SVM SYSTEM | CONSTANTLY SENSE PASSENGER | PUT GEAR SHIFT ON PARKING MODE AND TRANSMIT MESSAGE TO DRIVER'S TERMINAL |
| CONFIGURATION | SVM SYSTEM | SENSOR MEASURING SEAT WEIGHT IN VEHICLE | SVM SYSTEM | SENSOR MEASURING SEAT WEIGHT IN VEHICLE | DRIVER DEVICE AND COMMUNICATION DEVICE |

FIG. 5

APPARATUS AND METHOD FOR CONTROLLING SAFETY OF AUTONOMOUS PARKING SYSTEM

CROSS-REFERENCE TO RELATED APPLICATION

This application claims priority to and the benefit of Korean Patent Application No. 10-2018-0004501, filed on Jan. 12, 2018, which is incorporated herein by reference in its entirety.

FIELD

The present disclosure relates to an apparatus and a method for controlling a safety of an autonomous parking system. More particularly, the present disclosure relates to a technology to identify passengers in a vehicle and to perform safety measures.

BACKGROUND

The statements in this section merely provide background information related to the present disclosure and may not constitute prior art.

In general, an autonomous parking system is an automatic vehicle-maneuvering system that allows vehicles to search for a parking space in a parking lot, to self-park at the parking space, and to switch off the vehicle engine after parking the vehicle without the driver in the vehicle.

Further, the autonomous parking system switches on the vehicle engine by a request from the driver and drives the vehicle out of the parking lot to a position where the driver got out of the vehicle previously.

As an example, when the driver exits the vehicle in front of the parking lot and requests to self-park using a smart phone, the autonomous parking system allows the vehicle to autonomously drive into the parking lot, to search for the parking space, and to self-park. Then, when the driver requests to take the vehicle out of the parking lot using the smart phone in front of the parking lot, the autonomous parking system moves the vehicle from the parking space to the front of the parking lot where the driver is.

Accordingly, the driver does not need to go inside the parking lot and is able to save time needed to search for the parking space and to park.

Since the driver does not operate the vehicle when using the autonomous parking system, much greater safety is desired for the autonomous parking system than the smart parking assist system (SPAS) in which the driver enters the vehicle to control the gear and the brake.

In addition, for safety reason, it should be guaranteed that no one (e.g., the driver and a passenger) is in the vehicle when the autonomous parking system works.

However, we discovered that in a conventional autonomous parking system, the autonomous parking maneuver is performed in both cases: when the driver and the passenger(s) are all out of the vehicle, and also when someone (e.g., the driver or a passenger) is in the vehicle such that the conventional autonomous parking system does not provide sufficient safety to the passengers when the autonomous parking system works while there is a passenger in the vehicle.

SUMMARY

The present disclosure has been made to solve the above-mentioned problems occurring in the prior art while advantages achieved by the prior art are maintained intact.

An aspect of the present disclosure provides an apparatus and a method for controlling a safety of an autonomous parking system, which are capable of inhibiting or preventing from carelessly leaving a passenger in an unattended vehicle or preventing the passenger from being injured during an autonomous parking by determining whether a passenger is in an autonomous vehicle, determining a passenger's intention to stay in the autonomous vehicle during the autonomous parking, and afterward performing safety measures based on determination of whether the passenger is in the autonomous vehicle and the passenger intends to stay in the autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a safety control apparatus for an autonomous parking system includes: a sensor collecting data of a vehicle, a communication device transmitting a message informing a presence of a passenger in the vehicle to a driver terminal based on a determination of whether the passenger is present in the vehicle, a driver device performing an autonomous parking maneuver when the autonomous parking maneuver for the vehicle is selected through the driver terminal, and a controller determining whether the passenger is present in the vehicle before the autonomous parking maneuver, determining whether the passenger in the vehicle intends to exit the vehicle, and controlling an operation of the driver device during the autonomous parking maneuver.

The sensor counts a number of passengers who enter the vehicle and a number of passengers who exit the vehicle.

The sensor counts the number of passengers who enter the vehicle and the number of passengers who exit the vehicle in a case. In particular, the sensor operates one of the following times: a time before the vehicle starts driving, a time when the vehicle is driving, a time when a passenger exits the vehicle after the vehicle stops, and a time when the vehicle is autonomously parking.

The sensor counts the number of passengers, who enter the vehicle and the number of passengers who exit the vehicle, by using a voice recognition sensor, an ultrasonic sensor, or a sensor measuring a seat weight (e.g., a weight sensor) in the vehicle. The sensor may count the number of passengers when the vehicle is running and when the vehicle is autonomously parking.

The sensor counts the number of passengers who enter the vehicle and the number of passengers who exit the vehicle by using a surround view monitoring (SVM) system before the vehicle starts driving and after the vehicle stops and a passenger exits the vehicle.

The communication device transmits the message to the driver terminal using a blue link.

The driver device performs the autonomous parking maneuver using a steering device, a braking device, a driving device, a transmission device, and an air conditioning device during the autonomous parking maneuver.

The controller determines whether the passenger is present in the vehicle depending on the number of passengers who enter the vehicle and the number of passengers who exit the vehicle.

The controller provides a voice guidance allowing the vehicle to stop and provides a voice guidance allowing the passenger to exit the vehicle when the passenger intends to exit the vehicle after the passenger's intention to exit the vehicle is determined.

The controller provides a voice guidance to ask whether the passenger intends to continuously stay in the vehicle during the autonomous parking maneuver.

According to another aspect of the present disclosure, a safety control method for an autonomous parking system includes the steps of: turning on the autonomous parking system; sensing and counting, by a sensor, a number of passengers who enter or exit a vehicle to collect the number of passengers; determining, by a controller, presence of a passenger in the vehicle based on the counted number of passengers who enter and exit the vehicle; determining, by the controller, whether the passenger in the vehicle intends to exit the vehicle, finally determining, by the controller, whether the passenger with the intention to exit the vehicle exits the vehicle, and performing safety measures when the passenger remains in the vehicle.

The step of determining of the presence of the passenger in the vehicle includes transmitting a message informing that the passenger is present in the vehicle to a driver terminal when the passenger is present in the vehicle, and providing a voice guidance in the vehicle when the passenger is continuously present in the vehicle after the message is transmitted.

The providing of the voice guidance in the vehicle includes providing a voice guidance to ask whether the passenger intends to remain in the vehicle during the autonomous parking maneuver.

The determining of the presence of the passenger in the vehicle includes performing an autonomous parking maneuver when the passenger is not present in the vehicle.

The determining of the passenger's intention to exit the vehicle includes performing an autonomous parking maneuver when the passenger intends to exit the vehicle The finally determining of the passenger's getting out of the vehicle includes performing an autonomous parking maneuver when the passenger finally exits the vehicle.

The method further includes providing a voice guidance to stop the vehicle when the passenger intends to exit the vehicle and providing a voice guidance to allow the passenger to exit the vehicle after the determining of the passenger's intention to exit the vehicle and before the finally determining of the passenger's getting out of the vehicle.

The performing of the safety measures includes putting a gear shift of the vehicle on a P (parking) mode and transmitting a message informing that the passenger is continuously present in the vehicle to a driver terminal.

According to the safety control apparatus and the safety control method for the autonomous parking system, the passenger may be prevented from leaving in the vehicle unattended or from being injured.

According to the safety control apparatus and the safety control method for the autonomous parking system, duplicative message for the presence of a passenger in a vehicle is avoided by figuring out the passenger's intention to stay in the vehicle, and thus the convenience of the driver may increase.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a view illustrating a method of sensing a passenger using the safety control apparatus for the autonomous parking system;

FIG. 4 is a view illustrating a method of sensing a passenger using a safety control apparatus for an autonomous parking system;

FIG. 5 is a view illustrating a method of sensing a passenger using a safety control apparatus for an autonomous parking system.

Figure 1:
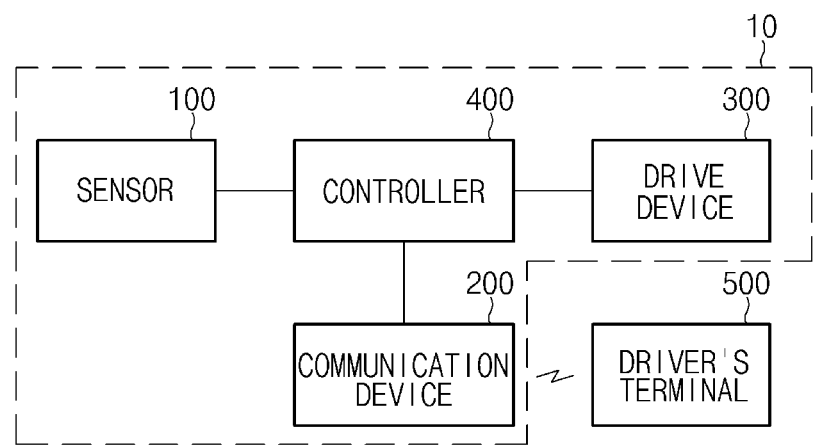
FIG. 1 is a block diagram illustrating a safety control apparatus for an autonomous parking system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. Hereinafter, exemplary forms of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary forms of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a safety control apparatus 10 for an autonomous parking system in an exemplary form of the present disclosure.

Referring to FIG. 1, the safety control apparatus 10 for the autonomous parking system is installed in a vehicle and includes a sensor 100, a communication device 200, a driver device 300, and a controller 400.

The sensor 100 is a module to collect various data desired for an autonomous parking, for example, to collect various data from a laser scanner, a navigation with a precise map of a parking lot, a global positioning system (GPS), an inertial measurement unit (IMU), an around view monitoring (AVM) system, a surround view monitoring (SVM) system, a voice recognition sensor, an ultrasonic sensor (or a headlining ultrasonic sensor), a sensor that measures a seat weight in the vehicle, a wheel speed sensor, electronic control units (ECU), an engine management system (EMS), an electronic stability control (ESC) system, an electric parking brake (EPB) system, a motor driven power steering (MDPS) system, an electronic transmission (E-shifter), etc. This is merely an example to help understanding the present disclosure, and the present disclosure should not be limited thereto or thereby.

The sensor 100 may collect various data from the electronic control units (ECU), the engine management system (EMS), the electronic stability control (ESC) system, the electric parking brake (EPB) system, the motor driven power steering (MDPS) system, and the electronic transmission (E-shifter) through a vehicle network. The vehicle network includes a controller area network (CAN), a local interconnect network (LIN), a FlexRay, a media oriented system transport (MOST), etc.

The sensor 100 may collect data related to the number of passengers who enter the vehicle and the number of passengers who exit the vehicle for a case before the vehicle starts driving, a case when the vehicle is running, a case after the vehicle stops and the passenger exits the vehicle, and a case when the vehicle is autonomously parking.

In one form, the sensor 100 of the safety control apparatus 10 for the autonomous parking system detects the passenger using the surround view monitoring (SVM) system, the voice recognition sensor, the ultrasonic sensor (or the headlining ultrasonic sensor), and/or a sensor that measures a seat weight in the vehicle, and further description of detecting the passenger by the sensor 100 will be described in detail with reference to FIGS. 3 to 5.

The communication device 200 transmits a message informing a presence of the passenger to a driver terminal 500 (or a user's terminal) when the passenger is present in the vehicle. As an example, the driver terminal 500 may be a smart key with a wireless communication functionality, a smart phone, or the like, and in one form, more than one driver terminal(s) 500 may be assigned to communicate with the communication device 200.

The communication device 200 may transmit the message to the driver terminal 500 using a blue link, and the driver terminal 500 may display a warning or provide a notification to the driver.

The driver device 300 performs an autonomous parking when the driver operates an autonomous parking maneuver button using the driver terminal 500. As an example, the autonomous parking maneuver may include a parallel parking, a right angle parking, a front parking, or a rear parking, and the autonomous parking may be performed using a steering device, a braking device, a driving device, a transmission device, an air conditioning device, etc., during the autonomous parking.

The controller 400 performs an overall control on the vehicle such that each element of the vehicle normally performs its function during the autonomous parking.

The controller 400 may determine whether the passenger is present in the vehicle by counting on the number of passengers who enter the vehicle and the number of passengers who exit the vehicle.

The controller 400 may provide a voice guidance (e.g., a voice output) in the vehicle when the passenger is still present in the vehicle. As an example, the voice guidance may be a voice guidance to ask whether the passenger intends to continuously stay in the vehicle during the autonomous parking. For instance, the voice guidance may provide the voice through an output device (not shown) included in the controller 400 or provide the voice through an output device (not shown) including an AVN device and a display device in the vehicle. These output devices may provide the guidance using not only the voice but also a text, a symbol, or a color.

The controller 400 determines whether the passenger in the vehicle intends to exit the vehicle when the vehicle is in the autonomous parking maneuver. As an example, the controller 400 may determine whether the passenger intends to continue staying in the vehicle by providing the voice, the text, or a signal to the passenger in the vehicle. This is merely an example to help understanding the present disclosure, and the present disclosure should not be limited thereto or thereby.

When the passenger in the vehicle intends to exit the vehicle, the controller 400 may perform the voice guidance to stop the vehicle and perform the voice guidance to allow the passenger to exit the vehicle. As an example, the voice guidance may be a voice guidance to ask the passenger whether the passenger intends to continuously stay in the vehicle during the autonomous parking. For instance, the voice guidance may provide the voice through the output device (not shown) included in the controller 400 or provide the voice through the output device (not shown) including the AVN device and the display device in the vehicle. These output devices may provide the guidance using not only the voice but also the text, the symbol, or the color.

The controller 400 may include a parking trajectory generator to generate a parking trajectory for the autonomous parking maneuver, a parking path generator to generate a parking path through which the vehicle moves during the autonomous parking, and a passenger safety controller to control safety of the passenger. This is merely an example to help understanding the present disclosure, and the present disclosure should not be limited thereto or thereby.

Figure 2:
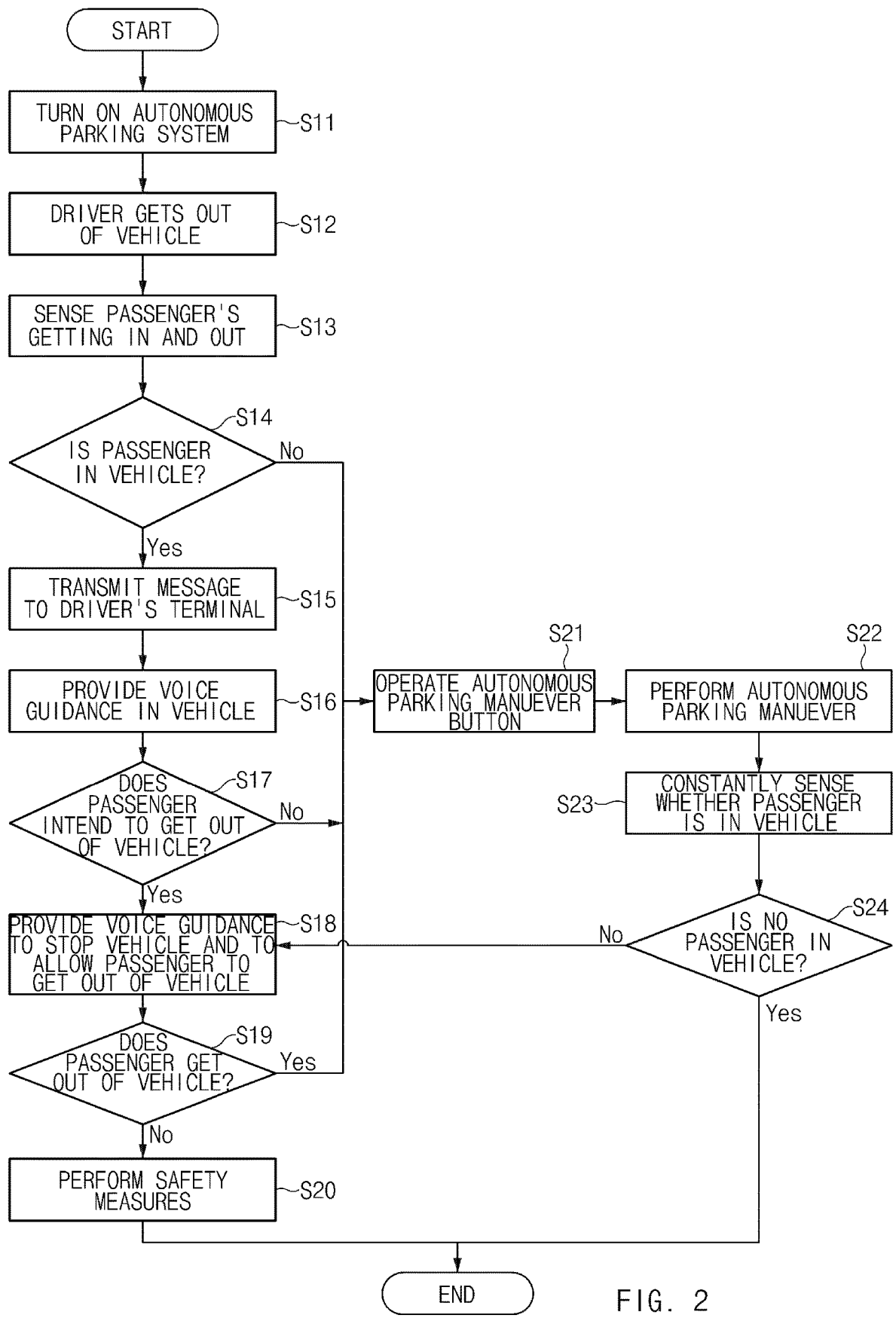
FIG. 2 is a flowchart illustrating a safety control method for the autonomous parking system.

FIG. 2 is a flowchart illustrating a safety control method for the autonomous parking system in an exemplary form of the present disclosure.

In one form, the safety control method for the autonomous parking system may include operation steps from S11 to S24 that will be described in detail with reference to FIG. 2.

In operation S11, the autonomous parking system is turned on.

In operations S12 and S13, the sensor 100 may sense whether the passenger enters or exits the vehicle after the driver exits the vehicle, and the controller 400 may compare the number of passengers who enter the vehicle with the number of passengers who exit the vehicle by sending passenger(s) getting in and out of the vehicle, and may collect a difference between the number of passengers who enter the vehicle with the number of passengers who exit the vehicle.

As an example, a method in which the sensor 400 senses whether the passenger enters and exits the vehicle using the voice recognition sensor will be described in detail with reference to FIG. 3, a method in which the sensor 400 senses whether the passenger enters and exits the vehicle using the ultrasonic sensor will be described in detail with reference to FIG. 4, and a method in which the sensor 400 senses whether the passenger enters and exits the vehicle using the sensor measuring the seat weight in the vehicle will be described in detail with reference to FIG. 5.

In operation S14, the controller 400 may compare the number of passengers who enter the vehicle with the number of passengers who exit the vehicle based on the sensed passenger's getting in and out of the vehicle, and may determine whether the passenger is present in the vehicle based on a difference between the number of passengers who enter the vehicle with the number of passengers who exit the vehicle.

In operation S15, in a case that the passenger is present in the vehicle (in a case that the number of passengers who enter the vehicle is greater than the number of passengers who exit the vehicle), the communication device 200 transmits the message (warning message) informing that the passenger is present in the vehicle to the driver terminal 500.

In operation S16, the controller 400 may provide the voice guidance (e.g., the voice output) in the vehicle when the passenger is still present in the vehicle. As an example, the voice guidance may be the voice guidance to ask whether the passenger intends to continuously stay in the vehicle during the autonomous parking. For instance, the voice guidance may provide the voice through the output device (not shown) included in the controller 400 or provide the voice through the output device (not shown) including the AVN device and the display device in the vehicle. These output devices may provide the guidance using not only the voice but also the text, the symbol, or the color. This is merely an example to help understanding the present disclosure, and the present disclosure should not be limited thereto or thereby.

In operation S17, when the passenger continues to stay in the vehicle, the controller 400 may determine whether the passenger in the vehicle has an intention to exit the vehicle. As an example, the controller 400 may determine whether the passenger intends to continue staying in the vehicle by providing the voice, the text, or the signal to the passenger in the vehicle and getting any feedback from the passenger or the driver. This is merely an example to help understanding the present disclosure, and the present disclosure should not be limited thereto or thereby.

In operation S18, when the passenger in the vehicle intends to exit the vehicle, the controller 400 may provide the voice guidance to stop the vehicle and provide the voice guidance to allow the passenger to exit the vehicle. As an example, the voice guidance may provide the voice through the output device (not shown) included in the controller 400 or provide the voice through the output device (not shown) including the AVN device and the display device in the vehicle. These output devices may provide the guidance using not only the voice but also the text, the symbol, or the color. This is merely an example to help understanding the present disclosure, and the present disclosure should not be limited thereto or thereby.

In operation S19, the controller 400 finally determines whether the passenger in the vehicle exits the vehicle.

In operation S20, in a case that the passenger in the vehicle does not exit the vehicle, the driver device 300 or the communication device 200 carries out the safety measures in response to a control of the controller 400. As an example, the driver device 300 puts a gear shift on a P (parking) mode, and the communication device 200 transmits a message to the driver terminal 500 to inform that the passenger still stays in the vehicle. This is merely an example to help understanding the present disclosure, and the present disclosure should not be limited thereto or thereby.

In operation S21, in a case that no passenger is present in the vehicle (in a case that the number of passengers who enter the vehicle is equal to or smaller than the number of passengers who exit the vehicle) after it is determined whether the passenger is present in the vehicle by the controller 400 in operation S14, the driver terminal 500 receives the message informing that no passenger is present in the vehicle through the communication device 200. The driver operates the autonomous parking maneuver button using the driver terminal 500 after receiving the message informing that no passenger is present in the vehicle. In addition, in the case that the passenger in the vehicle does not have the intention to exit the vehicle after operation S17, the driver operates the autonomous parking maneuver button using the driver terminal 500. Further, in the case that the passenger in the vehicle exits the vehicle after operation S19, the driver operates the autonomous parking maneuver button using the driver terminal 500.

In operation S22, when the autonomous parking maneuver button operates, the driver device 300 performs the autonomous parking for the vehicle. As an example, the driver device 300 may perform all parking operations related to the autonomous parking, e.g., the parallel parking, the right angle parking, the front parking, the rear parking, etc., in a searched parking space. This is merely an example to help understanding the present disclosure, and the present disclosure should not be limited thereto or thereby.

In operations S23 and S24, the sensor 100 constantly senses whether the passenger is present in the vehicle, and the autonomous parking for the vehicle is finished in the searched parking space when no passenger is present in the vehicle continuously during the autonomous parking.

As an example, in a case that the sensor 100 constantly senses whether the passenger is present in the vehicle and it is determined that the passenger is present in the vehicle, the controller 400 may provide the voice guidance to stop the vehicle or to allow the passenger to exit the vehicle.

FIG. 3 is a view illustrating a method of sensing a passenger using the safety control apparatus for the autonomous parking system in one exemplary form of the present disclosure.

Referring to FIG. 3, the method of sensing the passenger using the voice recognition sensor in the sensor 100 of the safety control apparatus 10 for the autonomous parking system will be described.

As an example, the SVM system may collect the number of passengers who enter the vehicle and the number of passengers who exit the vehicle before the vehicle starts driving and after the vehicle stops and the passenger exits the vehicle, the voice recognition sensor may collect the number of passengers who enter the vehicle and the number of passengers who exit the vehicle when the vehicle is running and when the vehicle carries out the autonomous parking maneuver, and the voice recognition sensor may collect the number of passengers who enter the vehicle and the number of passengers who exit the vehicle simultaneously with the SVM system. These are mere examples to help understanding the present disclosure, and the present disclosure should not be limited thereto or thereby.

As an example, when collecting the number of passengers who enter the vehicle and the number of passengers who exit the vehicle, the SVM system may collect the number of passengers who enter the vehicle and the number of passengers who exit the vehicle together with the voice recognition sensor in order to prevent the number of passengers who enter the vehicle and the number of passengers who exit the vehicle from being incorrectly counted in a case that the passenger is carrying a baby or a baggage while getting in and out of the vehicle or the passenger is a child.

FIG. 4 is a view illustrating a method of sensing a passenger using a safety control apparatus for an autonomous parking system in another exemplary form of the present disclosure.

Referring to FIG. 4, the method of sensing the passenger using the ultrasonic sensor (or the headlining ultrasonic sensor) in the sensor 100 of the safety control apparatus 10 for the autonomous parking system will be described.

As an example, the SVM system may collect the number of passengers who enter the vehicle and the number of passengers who exit the vehicle before the vehicle starts driving and after the vehicle stops and the passenger exits the vehicle, the ultrasonic sensor may collect the number of passengers who enter the vehicle and the number of passengers who exit the vehicle when the vehicle is running and when the vehicle carries out the autonomous parking maneuver, and the ultrasonic sensor may collect the number of passengers who enter the vehicle and the number of passengers who exit the vehicle simultaneously with the SVM system.

As an example, when collecting the number of passengers who enter the vehicle and the number of passengers who exit the vehicle, the SVM system may collect the number of passengers who enter the vehicle and the number of passengers who exit the vehicle together with the ultrasonic sensor in order to prevent the number of passengers who enter the vehicle and the number of passengers who exit the vehicle from being incorrectly counted in a case that the passenger is carrying a baby or a baggage while getting in and out of the vehicle or the passenger is a child.

As an example, the ultrasonic sensor may be provided in an upper part or a ceiling of the vehicle to monitor a back seat of the vehicle.

FIG. 5 is a view illustrating a method of sensing a passenger using a safety control apparatus for an autonomous parking system in another exemplary form of the present disclosure.

Referring to FIG. 5, the method of sensing the passenger using the sensor that measures the seat weight in the vehicle in the sensor 100 of the safety control apparatus 10 for the autonomous parking system will be described.

As an example, the SVM system may collect the number of passengers who enter the vehicle and the number of passengers who exit the vehicle before the vehicle starts driving and after the vehicle stops and the passenger exits the vehicle, the sensor measuring the seat weight in the vehicle may collect the number of passengers who enter the vehicle and the number of passengers who exit the vehicle when the vehicle is running and when the vehicle carries out the autonomous parking maneuver, and the sensor measuring the seat weight in the vehicle may collect the number of passengers who enter the vehicle and the number of passengers who exit the vehicle simultaneously with the SVM system.

As an example, the SVM system may collect the number of passengers who enter the vehicle and the number of passengers who exit the vehicle together with the sensor measuring the seat weight in the vehicle in order to prevent the number of passengers who enter the vehicle and the number of passengers who exit the vehicle from being incorrectly counted in a case that the passenger is carrying a baby or a baggage while getting in and out of the vehicle or the passenger is a child.

As an example, the sensor measuring the seat weight in the vehicle may collect the number of passengers who enter the vehicle and the number of passengers who exit the vehicle by sensing a variation in weight of the seat when the passenger enters and exits the vehicle and comparing the sensed variation in weight with a predetermined threshold value.

Figure 6:
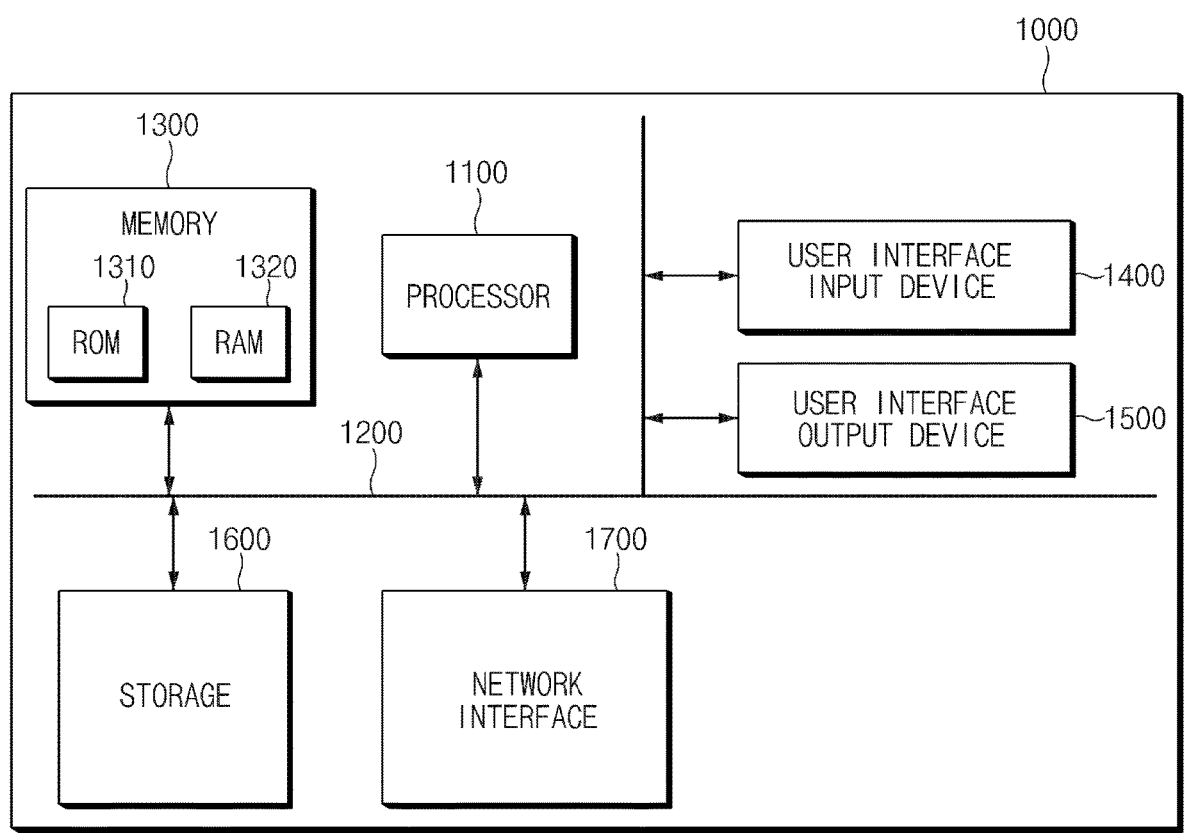
FIG. 6 is a block diagram illustrating a configuration of a computing system that executes a safety control method for an autonomous parking system.

FIG. 6 is a block diagram illustrating a configuration of a computing system that executes a safety control method for an autonomous parking system in one exemplary form of the present disclosure.

Referring to FIG. 6, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the processor and storage medium may reside as a separate component in the user terminal.

While the present disclosure has been described with reference to exemplary forms, it will be apparent to those skilled in the art that various changes and modifications may be made without departing from the spirit and scope of the present disclosure.

Therefore, exemplary forms of the present disclosure are not limiting, but illustrative, and the spirit and scope of the present disclosure is not limited thereto. It should be interpreted that all technical ideas which are equivalent to the present disclosure are included in the spirit and scope of the present disclosure.

What is claimed is:

1. A safety control apparatus for an autonomous parking system, comprising:
   a sensor configured to collect data of a vehicle;
   a communication device configured to transmit a message informing a presence of a passenger in the vehicle to a driver terminal based on a determination of whether the passenger is present in the vehicle;
   a driver device configured to perform an autonomous parking maneuver when the autonomous parking maneuver for the vehicle is selected through the driver terminal; and
   a controller configured to determine whether the passenger is present in the vehicle before the autonomous parking maneuver, determine whether the passenger in the vehicle intends to exit the vehicle, and control an operation of the driver device during the autonomous parking maneuver,
   wherein the autonomous parking maneuver is performed by the driver device when the controller determines that the passenger is present in the vehicle and the passenger in the vehicle intends to remain in the vehicle,
wherein during the performing of the autonomous parking maneuver, the controller is configured to:
continuously check whether the passenger intends to exit the vehicle based on an input from the passenger, and
when the passenger intends to exit the vehicle during the autonomous parking, stop the vehicle while providing a voice guidance to allow the passenger to exit the vehicle.

2. The safety control apparatus of claim 1, wherein the sensor is configured to count a number of passengers who enter the vehicle and a number of passengers who exit the vehicle.

3. The safety control apparatus of claim 1, wherein the sensor is configured to count a number of passengers who enter the vehicle and a number of passengers who exit the vehicle, wherein the sensor is configured to count the passengers at least one of a time before the vehicle starts driving, a time when the vehicle is driving, a time after the vehicle stops and the passenger exits the vehicle, or a time when the vehicle is autonomously parking.

4. The safety control apparatus of claim 3, wherein the sensor is configured to count the number of passengers when the vehicle is running or when the vehicle is autonomously parking, and the sensor includes at least one of a voice recognition sensor, an ultrasonic sensor, or a weight sensor configured to measure weight of a seat in the vehicle.

5. The safety control apparatus of claim 1, wherein the sensor is configured to count a number of passengers who enter the vehicle and a number of passengers who exit the vehicle using a surround view monitoring (SVM) system before the vehicle starts driving and after the vehicle stops and a passenger exits the vehicle.

6. The safety control apparatus of claim 1, wherein the communication device is configured to transmit the message to the driver terminal using a blue link.

7. The safety control apparatus of claim 1, wherein the driver device is configured to perform the autonomous parking maneuver using at least one of a steering device, a braking device, a driving device, a transmission device, or an air conditioning device during the autonomous parking maneuver.

8. The safety control apparatus of claim 1, wherein the controller is configured to determine whether the passenger is present in the vehicle based on a number of passengers who enter the vehicle and a number of passengers who exit the vehicle.

9. The safety control apparatus of claim 1, wherein the controller is configured to provide a voice guidance to ask whether the passenger intends to continuously stay in the vehicle during the autonomous parking maneuver.

10. A safety control method for an autonomous parking system, the method comprising the steps of:
turning on the autonomous parking system;
sensing and counting, by a sensor, a number of passengers who are entering and exiting a vehicle;
determining, by a controller, presence of a passenger in the vehicle based on the counted number of passengers;
during performing an autonomous parking maneuver, continuously checking, by the controller, whether the passenger in the vehicle intends to exit the vehicle based on an input from the passenger;
providing a voice guidance to stop the vehicle when the passenger intends to exit the vehicle;
providing a voice guidance to allow the passenger to exit the vehicle after the determining of the intention of the passenger to exit the vehicle;
determining, by the controller, whether the passenger with the intention to exit the vehicle exits the vehicle;
performing, by the controller, safety measures when the passenger remains in the vehicle; and
when the controller determines that the passenger is present in the vehicle and the passenger in the vehicle intends to remain in the vehicle, performing, by the controller, the autonomous parking maneuver.

11. The method of claim 10, wherein the step of determining of the presence of the passenger comprises the steps of:
transmitting a message informing that the passenger is present in the vehicle to a driver terminal when the passenger is present in the vehicle; and
providing a voice guidance when the passenger is continuously present in the vehicle after the message is transmitted.

12. The method of claim 11, wherein the voice guidance asks whether the passenger intends to remain in the vehicle during the autonomous parking maneuver.

13. The method of claim 10, wherein determining the presence of the passenger in the vehicle comprises performing the autonomous parking maneuver when the passenger is not present in the vehicle.

14. The method of claim 10, further comprising a step of performing the autonomous parking maneuver when the passenger with the intention to exit the vehicle finally exits the vehicle.

15. The method of claim 10, wherein the step of performing the safety measures comprises:
putting a gear shift of the vehicle on a parking mode; and
transmitting a message informing that the passenger is continuously present in the vehicle to a driver terminal.

* * * * *